United States Patent
Babej et al.

(10) Patent No.: US 8,083,451 B2
(45) Date of Patent: *Dec. 27, 2011

(54) HOLLOW FASTENER ELEMENT, ELECTRICAL CONNECTIONS AND COMPONENT ASSEMBLY

(75) Inventors: Jiri Babej, Lich (DE); Richard Humpert, Rosbach (DE); Michael Vieth, Bad Vilbel (DE)

(73) Assignee: Profil Verbindungstechnik GmbH & Co., KG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/119,882

(22) Filed: May 13, 2008

(65) Prior Publication Data

US 2008/0213064 A1    Sep. 4, 2008

Related U.S. Application Data

(60) Division of application No. 10/528,279, filed on Aug. 18, 2005, now Pat. No. 7,988,394, which is a continuation-in-part of application No. 10/472,648, filed on Mar. 30, 2004, now Pat. No. 7,367,767.

(30) Foreign Application Priority Data

Sep. 20, 2002 (DE) .................................. 102 43 759
Jul. 9, 2003 (WO) ........................ PCT/EP03/07436

(51) Int. Cl.
*F16B 37/06* (2006.01)
(52) U.S. Cl. ......... 411/179; 411/181; 411/188; 411/301
(58) Field of Classification Search .......... 411/176–183, 411/187, 188, 301
See application file for complete search history.

(56) References Cited

U.S. PATENT DOCUMENTS 2,255,964 A    9/1961    Blaho
(Continued)

FOREIGN PATENT DOCUMENTS

DE    2 108 057    9/1971
(Continued)

OTHER PUBLICATIONS

International Search Report for PCT/EP03/07436.
(Continued)

*Primary Examiner* — Flemming Saether
(74) *Attorney, Agent, or Firm* — Hershkovitz & Associates LLC; Abraham Hershkovitz; Eugene C. Rzucidlo

(57) ABSTRACT

A method for providing an electrically conductive connection between an electric terminal device having a cavity, such as a cable shoe, and a sheet metal part. A hollow fixing element is riveted to the sheet metal part to prevent torsion, thus producing an electrically conductive connection between the fixing element and the sheet metal part. The assembled component is then provided with an electrically non-conductive or poorly conductive protective coating, such as a lacquer coating or powder coating. A receptacle for the electric terminal device is configured in the vicinity of the front face of the fixing element, to which the electrical terminal device is attached. The receptacle prevents the torsion of the terminal device in relation to the fixing element. The sheet metal part and a thread forming or cutting screw is screwed through the cavity of the electric terminal device into the hollow fixing element. The screwing action forms or cuts a thread. The invention also relates to a corresponding fixing element and an assembled component that is produced by this method.

18 Claims, 10 Drawing Sheets

U.S. PATENT DOCUMENTS

| | | | | |
|---|---|---|---|---|
| 3,014,609 | A | * | 12/1961 | Hobbs .................... 29/509 |
| 3,314,138 | A | | 4/1967 | Double |
| 3,602,974 | A | | 9/1971 | Koett |
| 4,555,838 | A | | 12/1985 | Muller |
| 5,006,025 | A | * | 4/1991 | Duran .................... 411/183 |
| 5,439,336 | A | * | 8/1995 | Muller .................... 411/179 |
| 5,487,685 | A | | 1/1996 | Stillback et al. |
| 5,528,812 | A | | 6/1996 | Muller |
| 7,357,614 | B2 | * | 4/2008 | Babej et al. .................... 411/181 |
| 7,367,767 | B2 | * | 5/2008 | Babej .................... 411/181 |

FOREIGN PATENT DOCUMENTS

| | | |
|---|---|---|
| DE | 34 47 006 C2 | 7/1985 |
| DE | 34 46 978 C2 | 8/1985 |
| DE | 42 31 715 C2 | 4/1993 |
| DE | 2 693 842 A1 | 1/1994 |
| DE | 196 09 252 | 1/1997 |
| DE | 195 34 834 | 3/1997 |
| DE | 195 34 834 A1 | 3/1997 |
| DE | 40 39 472 A1 | 6/1997 |
| DE | 197 49 383 A1 | 5/1999 |
| DE | 198 48 617 A1 | 4/2000 |
| DE | 100 33 149 | 2/2001 |
| DE | 101 14 200 A1 | 9/2002 |
| DE | 101 19 505 A1 | 10/2002 |
| EP | 0 539 793 A1 | 5/1993 |
| EP | 0 713 982 A2 | 5/1996 |
| EP | 0 539 743 | 8/1997 |
| FR | 1 226 973 | 4/1960 |
| FR | 2 792 270 A1 | 10/2000 |
| GB | 2 180 905 | 4/1987 |
| WO | 99/58863 | 11/1999 |
| WO | 02/067382 A1 | 8/2002 |

OTHER PUBLICATIONS

German Language Search Report.
Translation of German Search Report dated Mar. 27, 2003 relating to German Patent Application No. 102 43 759.9.
German Search Report issued on May 17, 2010 corresponding to DE 102 43 759.9.
English language translation of German Search Report issued on May 17, 2010 corresponding to DE 102 43 759.9.

* cited by examiner

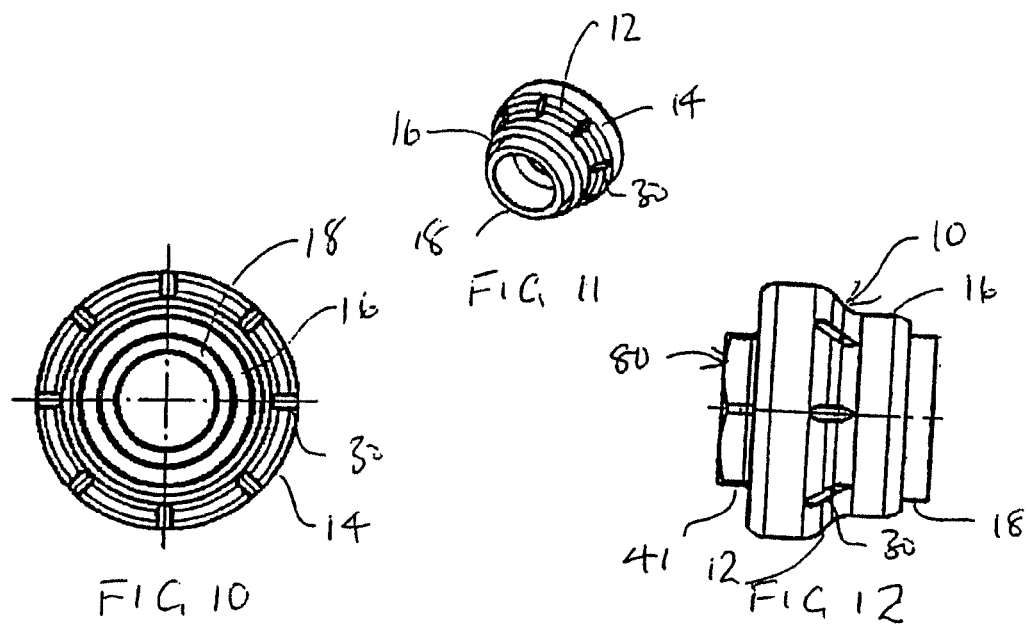
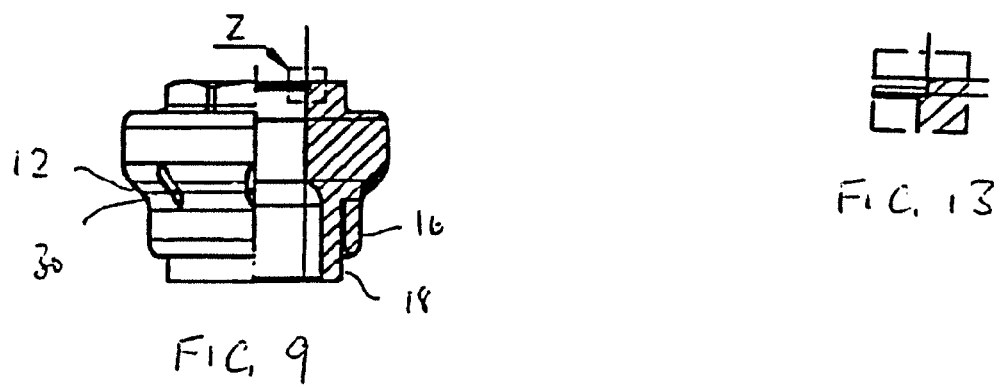
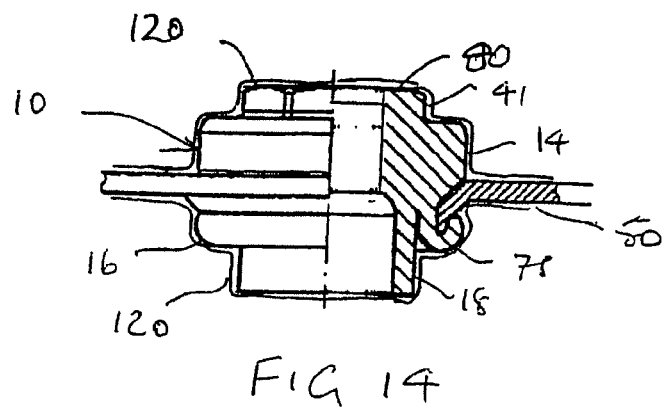

US 8,083,451 B2

HOLLOW FASTENER ELEMENT, ELECTRICAL CONNECTIONS AND COMPONENT ASSEMBLY

CROSS-REFERENCE TO RELATED APPLICATION

This application is a divisional of U.S. patent application Ser. No. 10/528,279 filed Mar. 17, 2005, which claims priority from a continuation-in-part application U.S. patent application Ser. No. 10/472,648 filed Mar. 21, 2002, which claims priority of PCT/EP03/007436 filed Jul. 9, 2003 and of Germany patent application No. 102 43 759.9 filed Sep. 20, 2002, and the complete contents of that application are incorporated herein by reference.

The present invention relates to a method for producing an electrically conductive connection between an electrical terminal device having a cutout, such as a cable shoe, and a sheet metal part, in which a hollow fastener element is rotationally fixedly riveted to the sheet metal part and an electrically conductive connection is hereby produced between the fastener element and the sheet metal part and the so manufactured component assembly is subsequently provided with an electrically non-conductive or poorly conductive protective coating such as for example a paint layer or a powder coating. Furthermore, the invention relates to a fastener element for the use of a method and a component assembly consisting of a fastener element and a sheet metal part.

A fastener element of the initially named kind is for example known from EP-A-539743.

The component assembly which arises when the fastener element is attached to a sheet metal part can be provided, in accordance with the initially named method, with a protective coating, such as for example a paint layer or powder coating. This is not expressly described in EP-A539743.

The nut element of EP-A-539793 cannot be attached to a sheet metal part in self-piercing manner but rather the sheet metal part must be prepierced. Furthermore, the sheet metal preparation described in EP-A539793 includes the generation of an axially projecting ring lip in the sheet metal part which bounds an opening into which the rivet section of the fastener element must be inserted. During this operation the ring lip projects at the side of the sheet metal part from which the fastener element is attached. The projecting lip with the pre-prepared opening signifies in practice that the fastener element must be aligned with high accuracy with respect to the sheet metal part in order to ensure an orderly attachment of the fastener element.

Furthermore, in the component assembly which arises when a fastener element in accordance with EP-A-539793 is attached to a sheet metal part, the problem exists that the protective coating applied to the component assembly makes it difficult to produce an electrically conductive connection from a cable shoe to the component assembly. The protective coating must be removed by intensive work from the critical position or the component must be so covered over at the position where the cable shoe is to be attached, likewise with intensive work, so that the protective coating which is deposited there can be removed with the cover. It is furthermore unfavourable in this method that, on removing the cover, exposed surface regions of the fastener element exist which are no longer provided with the protective coating and which corrode in the long term. This is not only ugly but rather the corrosion which progresses can lead to an undesired deterioration of the electrical contact between the terminal device and the fastener element.

BRIEF SUMMARY OF THE INVENTION

The object of the present invention is to so improve a method or a fastener element and a component assembly of the initially named kind that an electrical connection of high quality can be achieved between the electrical terminal device and the sheet metal part in a cost-favourable manner without the protective coating impairing the quality of the electrical connection and without complicated measures having to be taken in order to remove the protective coating.

In order to satisfy this object there is provided, in accordance with the invention, a method of the initially named kind which is characterized in that a mount for the electrical terminal device is formed in the region of the end face of the fastener element to which the electrical terminal device is attached and prevents a rotation of the terminal device relative to the fastener element and the sheet metal part and in that a thread forming or thread cutting screw is screwed through the cut-out of the electrical terminal device and into the hollow fastener element and there forms or cuts a thread by the screw-in movement.

Furthermore, in accordance with the invention, a fastener element is provided for the electrically conductive attachment of an electrical terminal device such as a cable shoe to a sheet metal part which is characterized in that the hollow fastener element has a head part and a rivet section, with the rivet section merging via a contact surface for the sheet metal part into the head part and with features providing security against rotation being provided at the contact surface and/or at the rivet section, wherein the hollow fastener element has a bore, for example a smooth cylindrical bore, at a point at which a thread is to be formed by screwing-in a thread cutting or thread forming screw and in that a mount for the rotationally secure attachment of the electrical connection device to the fastener element is provided at the end face of head part remote from the rivet section.

Through the attachment of such a fastener element to a sheet metal part a component assembly then results in accordance with the invention consisting of a sheet metal part and a hollow fastener element attached to it via a rivet connection, wherein the fastener element is rotationally fixedly secured to the sheet metal part by means of features providing security against rotation and the fastener element and the sheet metal part are jointly coated with an electrically non-conductive or poorly conductive protective coating and an electrically conductive path is provided between the fastener element and the sheet metal part in the region of the rivet connection and/or the features providing security against rotation. The component assembly is characterized in that fastener element has a smooth cylinder bore for receiving a thread forming or cutting screw and in that the fastener element has a mount at the end face remote from the rivet connection for the rotationally secure attachment of the electrical terminal device.

The fastener element is preferably attached in self-piercing manner to the sheet metal part, that is to say that either the rivet section can be formed as a piercing and riveting section or a tubular part of the fastener element in the region of the riveting section can be used as the piercing device in order to pierce a hole in the sheet metal part. The force which is required in order to carry out the piercing process can for example be delivered as usual during the attachment of fastener elements to sheet metal parts by a press which takes care of the carrying out of the attachment process. Alternatively, it can be made available by a robot or other types of tools. The use of fastener elements in self-piercing embodiments not only has the advantage that in this way one working step in the sense of the prepiercing of the sheet metal part can be avoided, but rather the piercing process also ensures that clear metallic surfaces are present at the fastener element and at the sheet metal part which take care of a low transition resistance between the fastener element and the sheet metal part, i.e. that a high quality electrical connection is present at the corresponding points.

Through the rotationally secure attachment of the fastener element to the sheet metal part a high quality electrical connection is likewise achieved between the fastener element and the sheet metal part in the region of the features providing security against rotation which normally have the form of ribs and which can optionally be made with sharp edges in order to ensure an even better electrical transition to the sheet metal part. If the component assembly so produced is provided with an electrically non-conductive or poorly conductive protective layer the electrically conducting transition region between the component assembly and the sheet metal part is sealed off from the outside so that corrosion at these points need not be feared. That is to say, conductive transitions arise between the piercing section of the fastener element and the sheet metal part and between the features providing security against rotation and the sheet metal part at positions where the elements lie so tightly against one another that a penetration of the protective coating at these points do not occur. The sealing of the component assembly by the protective layer also prevents oxygen and humidity reaching these conductive transitions whereby corrosion at these points is prevented long term.

The protective coating however fully covers over the outwardly disposed surface regions of the fastener element and frequently also penetrates into the bore of the hollow fastener element, in particular, when electrostatic aids are used during the painting. At this point it should be briefly mentioned that the said bore does not strictly speaking have to be produced by a boring tool, but can rather also be produced by cold heading tools or by piercing processes or in other ways. The designation bore is thus to be understood in such a way that it is not restricted to a specific manufacturing process.

Through the use of a thread cutting or forming screw in order to screw the electrical terminal device to the exposed end face of the fastener element an intensive mechanical working of the bore of the fastener element by the screw takes place on the one hand, so that high quality electrical transitions between the screw and the fastener element are also provided here. Any protective coating which is present in the bore is at least partly scraped away or cut away by the screwing in of the screw and a considerable contact pressure arises between the screw and the fastener element so that a high quality electrical connection is also present in these regions in the long term. Any residues of protective coatings which are trapped in the region of the thread take care of a sealing of the thread and also contribute to the protection against corrosion. There is no need to scratch away or otherwise remove the protective coating from the end face of the fastener element prior to the attachment of the electrical terminal device. The electrical terminal device sits at its one side on this protective coating at the end face of the fastener element. However the head of the screw forms a high quality electrical connection to the electrical terminal device. Since the electrical terminal device is rotationally securely held to the fastener element a certain amount of slippage arises between the head of the screw and the electrical terminal device during the tightening of the screw which takes care of fresh metallic surfaces at this point so that a high quality electrical connection also arises here.

The electrically conductive connection thus leads from the electrically terminal device via the screw into the fastener element in the region of the thread and from the metallic fastener element via the features providing security against rotation and surface regions in the vicinity of the pierced hole into the sheet metal part. The sheet metal part is then normally incorporated into a vehicle body or into a housing which can be termed earth.

Since a thread cutting or thread forming screw is used and since the bore of the hollow fastener element can be occupied at least in part with a protective coating a considerable friction arises between the screw and the fastener element during attachment of the screw so that considerable torques are exerted on the fastener element. The security against rotation between the fastener element and the sheet metal part must therefore be so designed that it can withstand such rotary forces. Also the application of the corresponding rotary forces via the tool that is used frequently leads to a pronounced button out moment at the element itself so that the connection between the fastener element and the sheet metal part should be secure against such button out moments, i.e. a considerable button out resistance that should be present.

This requirement is satisfied by a fastener element which is characterized in that a tubular guide section is disposed concentric to the tubular rivet section and radially within the latter, with a ring gap being present between the guide section and the rivet section and with the guide section projecting beyond the free end of the rivet section.

Since a tubular guide section is disposed concentric to the tubular rivet section and radially within the latter, with the guide section projecting beyond the second end of the rivet section, care has been taken, in accordance with the invention, when using the fastener element with a prepierced sheet metal, that the guide section moves into the hole of the prepierced sheet metal, optionally with dilation of the hole, and takes care of centering of the fastener element relative to the pre-manufactured hole or to the dilated hole. Since the guide process takes place before the subsequent dilation of the hole by the rivet section and the subsequent beading over of the rivet section it is also ensured that a high quality mechanical and electrical connection always arises between the fastener element and the sheet metal part.

Should a pre-piercing of the sheet metal part be provided, which is basically possible, but which is not however preferred, then this pre-piercing can also be effected in such a way that no projecting ring-lip is present at the side of the sheet metal part from which the fastener element is introduced, which likewise facilitates the alignment of the fastener element with the sheet metal part.

In the present invention it is particularly favourable that the guide section of the fastener element can be formed as a piercing section, with the fastener element being introduced in self-piercing manner into the sheet metal part, so that a pre-piercing is not necessary at all and the requirements placed on the alignment of the fastener element with the sheet metal part are even lower. Through the self-piercing design of the fastener element a favourably priced manufacture of the component assembly is also achieved because the operation of pre-piercing theسheet metal part is omitted. In this way the method for the attachment of the fastener element to the sheet metal part is also simplified.

At this point reference should briefly be made to DE-C-3446978 and DEC-3447006. DE-C-3446978 describes amongst other things a nut element which can be introduced in self-piercing manner into a sheet metal part whereas DE-C-3447006 discloses a similarly conceived bolt element. Neither the nut element nor the bolt element in accordance with the above-named German patent has a guide section in addition to the rivet section, so that the rivet section has to execute both the piercing function and also the riveting function, which is ultimately more complicated and places more stricter requirements on the rivet section and on the die button that is used than in the case of the above designated arrangement with separate riveting and piercing sections. Nevertheless a fastener element with a piercing and riveting section can be exploited for the purpose of the present invention as will be explained in more detail later.

It is particularly preferred if the free end of the wall of the ring-like rivet section is rounded as seen in an axial section plane, both at the radially outer side and also at the radially inner side and for example has a semicircular shape or a shape resembling an arrow-tip.

As already indicated the guide section of the fastener element leads during the attachment of the fastener element to a sheet metal part, to a conical recess in the sheet metal part and indeed, in a pre-pierced sheet metal part, during the dilation of the hole by the guide section and, in a self-piercing embodiment of the fastener element, prior to the cutting out of a piercing slug by the guide section which forms a piercing section, with the conical recess then being dilated by the riveting section. The rounded embodiment of the outer wall of the rivet section in the region of its free end is a favourable shape for the further dilation of the hole and the corresponding deformation of the conical wall of the recess. The rounded shape at the inner side of the free end of the rivet section helps in contrast during the beading over of the rivet section which takes place in a correspondingly concavely arched ring surface of the die button. This shape also makes it possible for the ring gap to be kept as small as possible without impairing the process of beading over the rivet section. Since the ring gap can be kept as small as possible and can indeed amount to 0 mm (which signifies that the inner wall of the rivet section contacts the outer periphery of the guide section) the diameter of the fastener element as a whole can be kept as small as possible whereby material is saved and costs are reduced.

The ring gap preferably has a radial dimension in the range between 0 mm and approximately 3 mm. The ring gap preferably ends at an axial spacing in front of the ring-like contact surface at the rivet section side of the ring-like contact surface. This design leads to a stable attachment of the rivet section to the head part of the element and favours a firm attachment of the fastener element to the sheet metal part.

When the guide section is formed as a piercing section it preferably has a ring-like cutting edge at its end remote from the contact surface and this cutting edge cooperates with a correspondingly shaped cutting edge of a central bore of a die button in order to punch out a clean piercing slug from the sheet metal part during the attachment of the fastener element to the sheet metal part.

It is particularly preferred when features providing security against rotation are disposed in the region of the contact surface and/or at the rivet section and/or at the jacket surface of the head part adjacent to the contact surface. When the features providing security against rotation are provided in the region of the jacket surface of the head part then they can be produced by a polygonal or grooved form of the jacket surface. The features providing security against rotation can be formed by noses or by groove-like recesses in the region of the ring-like contact surface and/or at the rivet section and optionally at the jacket surface.

When noses providing security against rotation are provided then these can be present in raised form at the contact surface and at the rivet section in the region of the transition from the contact surface into the rivet section.

The mount for the electrical terminal device is preferably formed by at 5 least one projection with projects beyond the end face of the fastener element. Here a projection, for example, formed as a lug, is sufficient in order to prevent a rotation of the electrical terminal device, for example in the form of a cable shoe, since with an initial rotation of the cable shoe the connection region for the cable then enters into contact against a flank of the projection or of the lug and prevents a further rotation of the electrical terminal device. It is even more favourable when the fastener element is executed with two projections which are formed by two lugs having a spacing from one another which are arranged to the side of the bore of the hollow fastener element. The region of the cable shoe which receives the cable can then be positioned between the two lugs and the relative rotation between the cable shoe and the fastener element can be reduced to a minimum which is determined by the spacing between the two lugs. On the other hand, the two lugs provide two open regions in which the cable connection region of the cable shoe can be selectively disposed. Naturally a plurality of projections can also be provided, whereby a plurality of open regions are provided between two lugs in each case, so that a plurality of possible orientations of the cable shoe are present.

The projection can also extend around the bore of the fastener element and be made polygonal in its external outline. For example external outlines in triangular, square, hexagonal or octagonal form can be considered, with the octagonal form being particularly preferred because it permits a plurality of possible orientations of a correspondingly designed cable shoe.

Further preferred embodiments of the method of the invention, of the fastener element and also of the component assembly can be seen from the accompanying subordinate claims and also from the further description of embodiments.

The invention will be explained in more detail in the following by way of example and with reference to embodiments and to the drawings.

BRIEF DESCRIPTION OF THE SEVERAL VIEWS OF THE DRAWINGS

FIG. 9 shows an alternative embodiment of the fastener element similar to the fastener element of FIGS. 1-8, but with a different mount for the electrical terminal device, with FIG. 9 showing the element partly in side view and partly in longitudinal section, FIG. 10 shows a plan view on the lower side of the fastener element of FIG. 9, FIG. 11 shows a perspective illustration of the fastener element of FIGS. 9 and 10, FIG. 12 shows a side view of the fastener element of FIGS. 9, 10 and 11, FIG. 13 shows the detail Z in FIG. 9, FIG. 14 shows the fastener element of FIG. 9 attached to a sheet metal part.

DETAILED DESCRIPTION OF THE INVENTION

Figure 1:
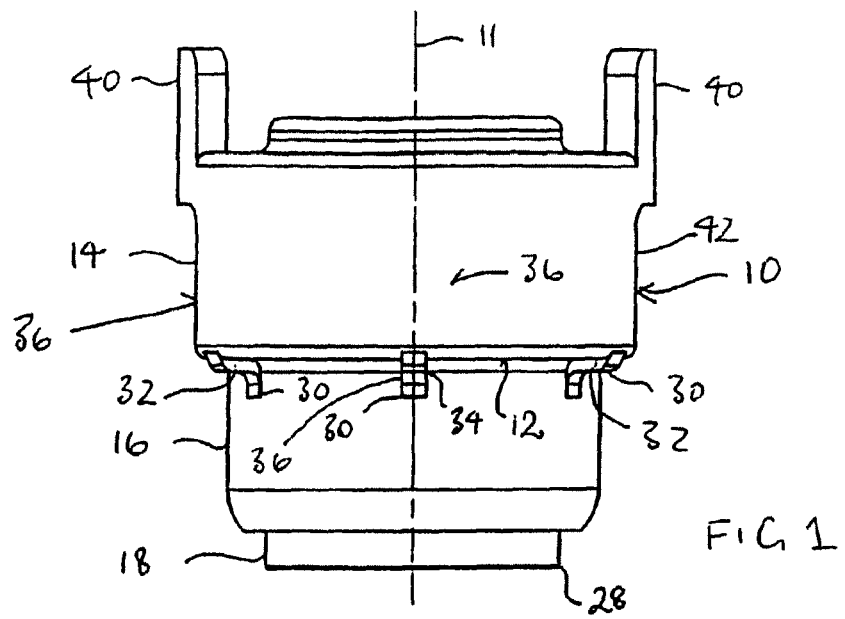
FIG. 1 shows a side view of a hollow fastener element in accordance with the invention.
Figure 2:
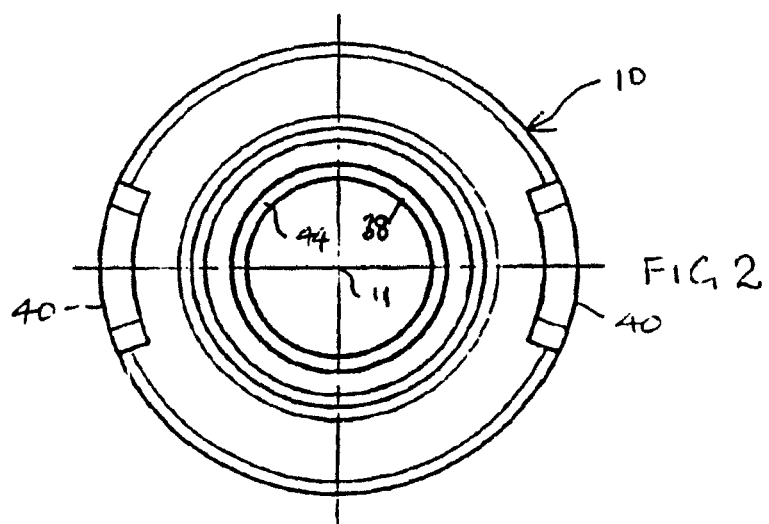
FIG. 2 shows a plan view of the upper end face of the fastener element of FIG. 1.
Figure 3:
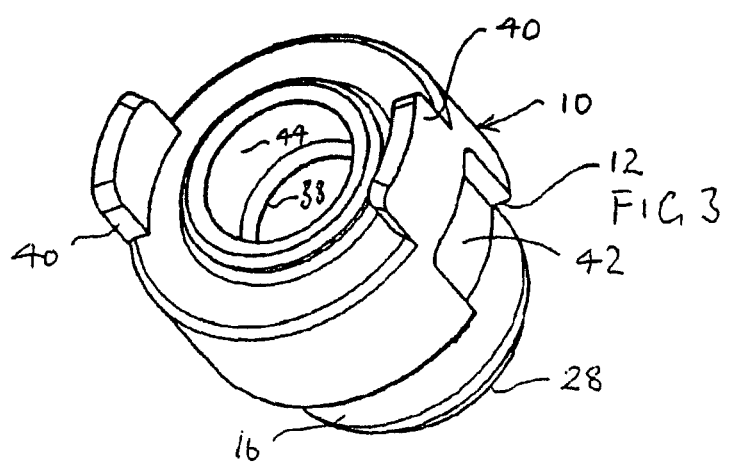
FIG. 3 shows a perspective illustration of the fastener element of the FIGS. 1 and 2.

Referring to FIGS. 1 to 4 the fastener element 10 shown there is provided with a head part 14 having a ring-like contact surface 12 and a tubular rivet section 16 provided at the side of the contact surface 12 of the head part 14 and extending away from the head part 14. The fastener element has a central longitudinal axis 11. A tubular guide section 18 is arranged concentric to the tubular rivet section 16 and radially within the latter, with a ring gap 20 being provided between the guide section 18 and the rivet section 16, the ring gap only being visible in FIG. 4.

Figure 4:
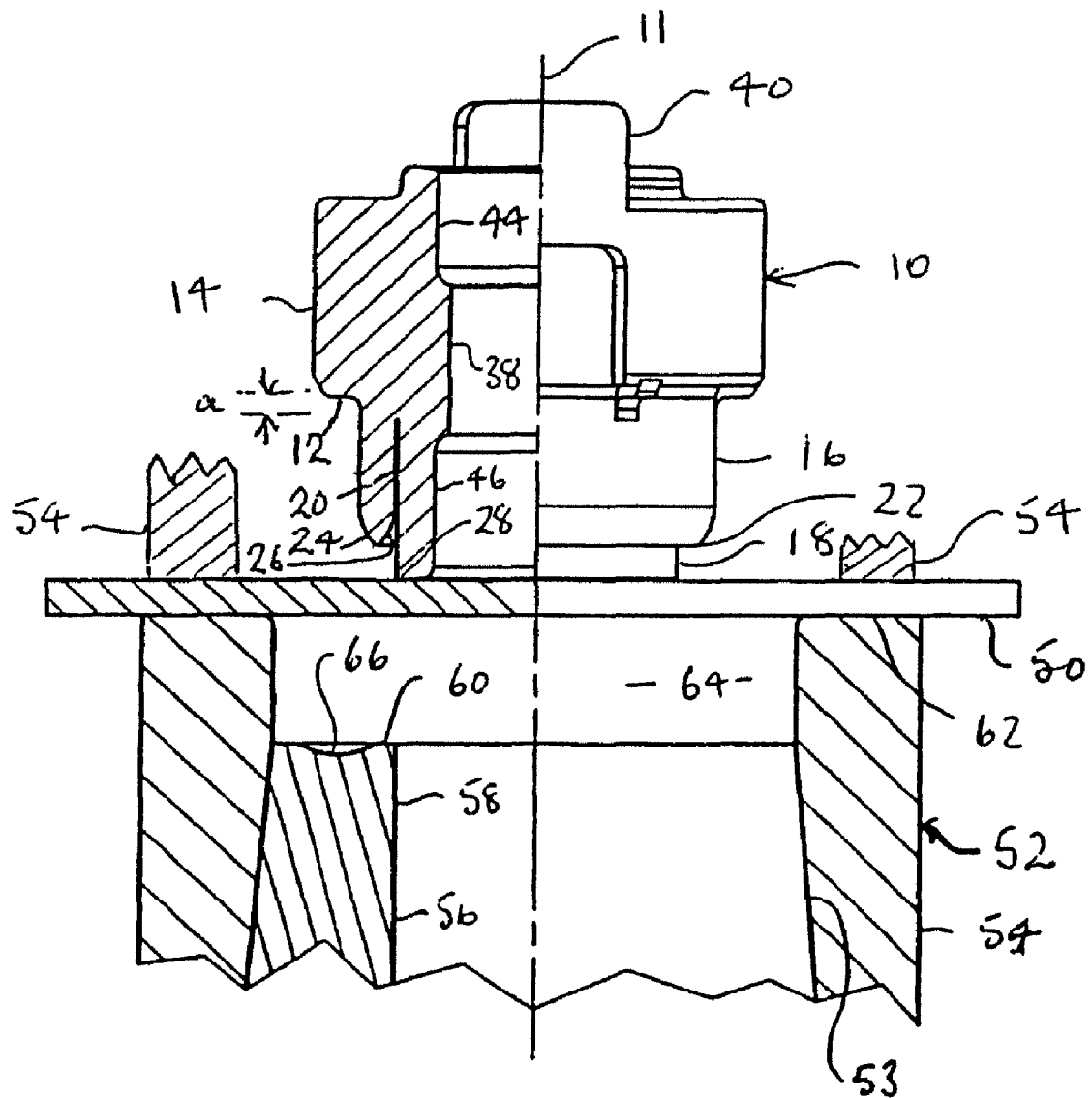
FIG. 4 shows a representation partly sectioned in the longitudinal direction of the fastener element of the FIGS. 1 to 3 in the starting stage of the attachment of the fastener element to a sheet metal part using a die button.

As can likewise be seen from FIG. 4 the free end 22 of the wall of the ring-like rivet section 16 is rounded when viewed in the axial section plane of FIG. 4 both at the radially outer side 24 and also at the radially inner side 26 and has here a rounded shape resembling an arrow-tip. The tip of shape resembling an arrow-tip could however likewise be rounded, which would result in a semicircular shape, which is however not shown.

In the illustration of FIG. 4 the ring gap has a radial dimension of 0 mm i.e. the rivet section contacts the guide section 18 but is first connected to the guide section 18 at the position where the ring gap 20 finishes at a short axial spacing "a" from the ring-like contact surface 12.

The fastener element of FIGS. 1 to 4 is normally produced by a cold heading process, the basic principles of which are well known per se. In order to manufacture the rivet section which closely contacts the guide section it can be necessary to first produce the rivet section with a certain radial spacing from the guide section by cold heading and subsequently, in a further phase of the cold heading process, to press the rivet section against the guide section or to dilate the guide section until it enters into contact with the rivet section or to achieve the reduction of the radial spacing by a combination of the two measures. It is favourable when the ring gap 20 has the smallest possible radial width because this leads to a compact design of the fastener element and saves material.

The guide section 18 is formed here as a piercing section and has a ring-20 like cutting edge 28 at its end remote from the contact surface 12, i.e. at its free end.

The FIGS. 1 to 4 furthermore show features 30 providing security against rotation in the region of the ring-like contact surface 12 and at the rivet section 16, with the features providing security against rotation being formed here by noses which are present in raised form at the contact surface 12 and at the rivet section 16 in the region of the transition from the contact surface into the rivet section 16. The noses providing security against rotation shown here are provided with side flanks 30 and 32 which lie in planes extending in the longitudinal direction of the element.

The noses providing security against rotation are made with sharp edges at 34 and 36 in FIGS. 1 and 4 and could instead be provided here with rounded edges. The noses providing security against rotation could also be realized by recesses in the contact surface or in the rivet section. The possibility also exists of giving the jacket surface 36 of the head part 14 a polygonal or grooved shape. The hollow fastener element has a smoothed cylindrical bore which is disposed coaxial to the longitudinal axis 11 of the fastener element and in this example is partly present in the guide section 18.

The diameter of the smooth cylindrical bore is so dimensioned that by turning in a thread cutting or thread forming screw, such as is for example explained in more detail with reference to FIG. 15, a thread of the desired size arises. For an M8 thread the diameter of 7.55 is for example selected for a thread forming screw. For thread cutting screws the usually provided dimensions can likewise be selected.

A further special feature of the hollow fastener element of FIGS. 1 to 4 is to be seen in the two lugs 40 which projects from the upper end face of the element 10 and which can be produced by shifting material from the regions 42 upwardly during the cold heading process so that recesses arise at the corresponding positions 42. The designation "upwardly' is only to be understood with reference to the illustration of FIG. 1 and, as are other statements of position in this application, only used in relation to the Figures and do represent a spatial restriction of the subject of the invention. The lugs 40 ensure that a cable shoe an be secured to the fastener element by means of a screw inserted from above without the cable shoe rotating during attachment of the screw, since a co-rotation of the cable shoe is prevented by the lugs 40.

Figure 16:
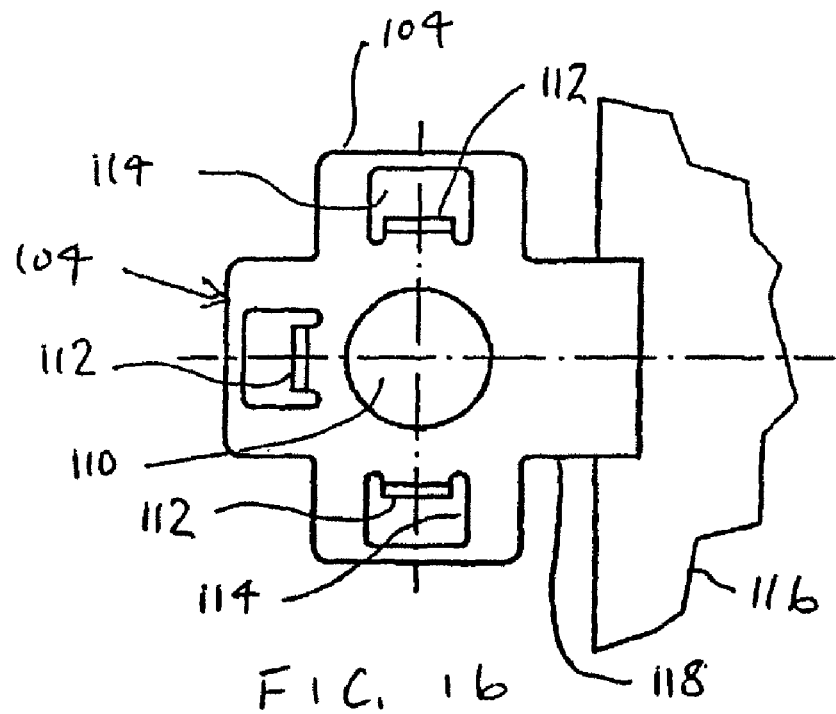
FIG. 16 shows a plan view of the electrical terminal device of FIG. 15 prior to attachment to the fastener element of FIG. 15.

The cable shoe which represents an electrical terminal device can have a connection surface provided as an eye which has a circular cut-out to receive the said screw, or can have a—likewise known—U-shaped cut-out which is bounded by two terminal legs. In both cases a connection region extending sideways away from the connection surface is provided which holds a cable which is normally secured in current conducting manner to this connection region via a crimped connection. The precise design of the electrical terminal device is however not restricted to such embodiments and can in principle have any desired form including the form of sheet metal parts, for example sheet metal parts which project out of a housing on the electrical apparatus, as is for example shown in FIGS. 15 and 16. It is only necessary for the form of the mount at the fastener element to be compatible with the form of the electrical terminal device so that the desired security against rotation is achieved.

As is evident from FIG. 4 the fastener element 10 has cylindrical free spaces or cut-outs 44 and 46 above and below the smooth cylindrical bore 38 with these free spaces having a diameter which is normally dimensioned to be fractionally larger than the outer diameter of a screw which is screwed into the cylindrical bore 38.

Although the cylindrical bore 38 is here arranged partly in the head part 14 and partly in the guide section 18 of the fastener element 10 it could also be fully arranged in the head part or fully arranged in the guide section.

FIG. 4 shows the fastener element 10 in a first stage of the attachment to the sheet metal part 50, with the sheet metal part being supported in the illustration of FIG. 4 on a die button 52 and being pressed against the die button 52 by means of a ring-like hold-down member 54, with the hold-down member 54 being preferably provided but not essential.

The illustration of FIG. 4 assumes that the attachment of the fastener element 10 to the sheet metal part 50 takes place in a press, with the die button 52 being arranged in the lower tool of the press (not shown) and the fastener element being pressed by means of a likewise non-illustrated setting head onto the sheet metal part 50, with the setting head being able to be attached to an intermediate plate of the press or to an upper tool of the press. Such setting heads and hold-down members 54 are well known in the prior art and will therefore not be especially described here. It should, however, be noted that other arrangements within a press are also possible. For example, the die button 52 can be arranged in an intermediate plate of the press with the setting head, with or without a hold-down member, then being attached to the upper tool of the press. It is also possible to provide the die button 52 at the upper tool of the press and to then mount the setting head, with or without the hold-down member on an intermediate plate of the press or on the lower tool of the press, i.e. to attach the fastener element 10 in the reverse direction below the sheet metal part 50.

It is also possible to attach the fastener element 10 to the sheet metal part 50 by a robot or by using a C-frame with pressure cylinder known per se, with the robot or an auxiliary robot then holding the die button 52 below the sheet metal part and serving for the application of the required pressing force on the fastener element 10.

In FIG. 4 a two-part design of the die button 52 is shown. This consists of an outer ring-like die part 54 and an inner likewise ring-like die part 56 having a central longitudinal bore 58. In this example the inner die part 56 has a slightly conically extending outer wall which cooperates with a correspondingly shaped conically extending inner wall 53 of the outer die part 54 so that the upper end face 60 of the inner die part 56 lies below the upper end face 62 of the outer die part 54 and hereby forms a recess 64. The upper end face 60 of the inner die part 56 also forms the base surface of the recess 64 and has in other respects a ring-like concavely arched surface 66. The central bore 58 of the central die part 56 has a diameter which is fractionally larger than the outer diameter of the guide section 18. The recess 64 has a diameter which is somewhat larger than the outer diameter of the head part 14 of the fastener element 10 plus the double-thickness of the sheet metal part 50.

Both the inner die part 56 and also its bore 58 and also the outer die part 54 and the recess 64 defined between the two die parts are disposed coaxial to the central longitudinal axis 11 of the fastener element 10. The die button 52 could also be made in one-part form.

Figure 5:
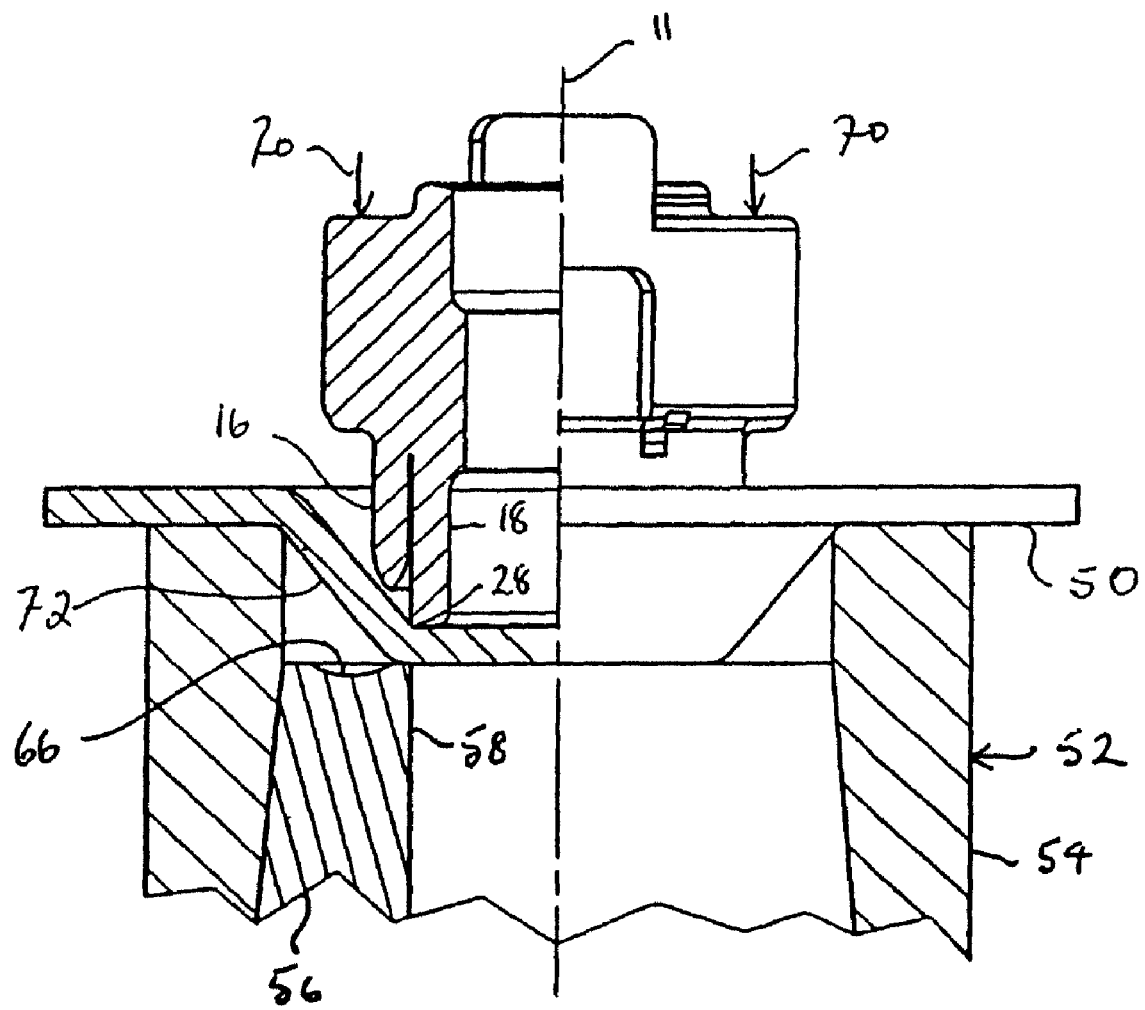
FIG. 5 shows a representation similar to FIG. 4 but at a later phase of the attachment of the fastener element to the sheet metal part.

Starting from the stage of FIG. 4 the fastener element 10 is now pressed towards the sheet metal part 50 in accordance with FIG. 5 by the application of a force in the arrow direction 70 onto the upper end face of the fastener element 10 by means of the setting head, for example in the press, or by using a robot and with simultaneous support of the die button, with the hold-down member 54 which is optionally provided in FIG. 5 being omitted for the sake of the illustration.

One sees that the guide section presses the sheet metal part against the upper end face 60 of the inner die part 56 and has drawn the sheet metal part into a conically extending recess 72. At this stage the ring-like cutting edge 28 of the guide section formed as a piercing section 18 has not yet started to cut through the sheet metal part 50 and the free lower end face 22 of the rivet section 16 has not yet contacted the sheet metal part 50.

Figure 6:
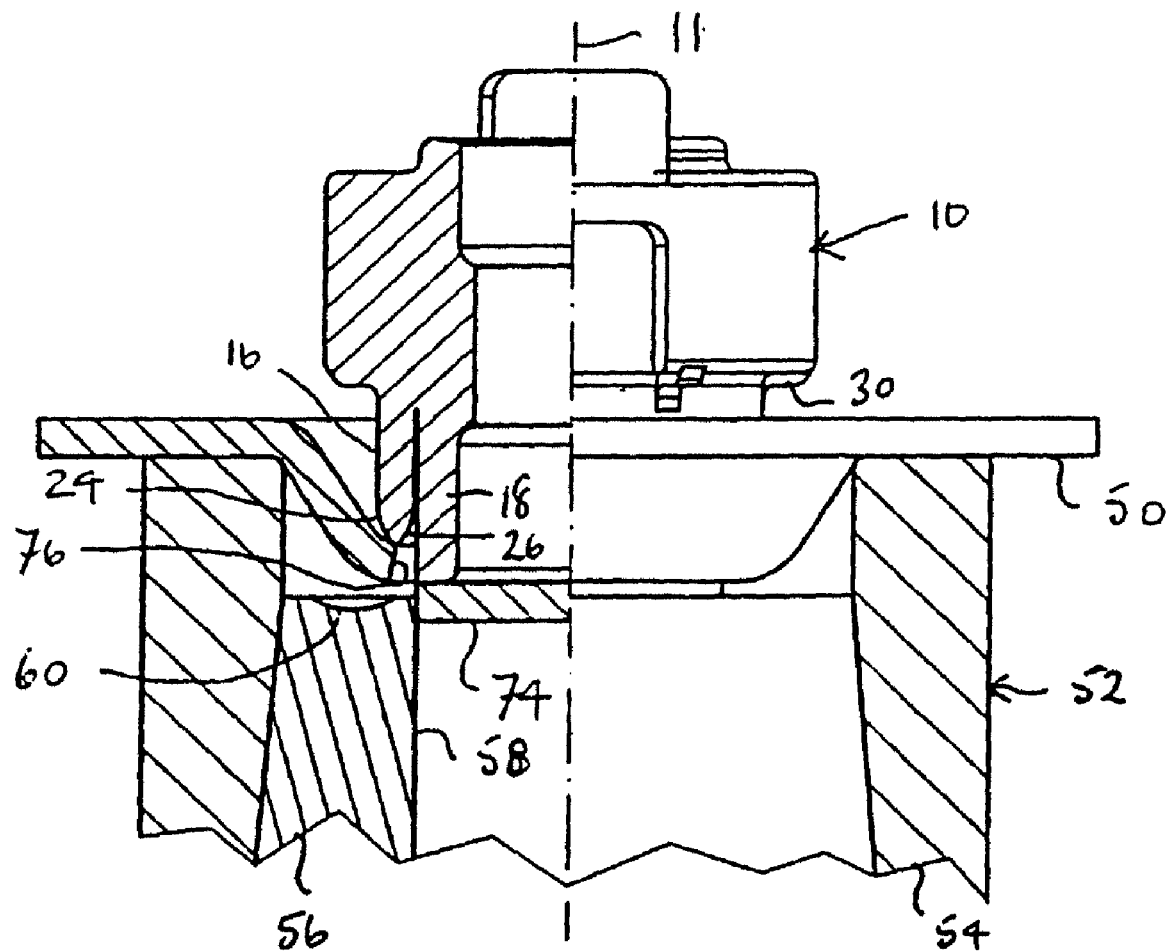
FIG. 6 shows a representation similar to FIG. 5 but at a yet later stage of the attachment of the fastener element to the sheet metal part.

In the further stage of FIG. 6 the guide section 18 has separated a piercing 5 slug 74 from the base of the conical recess of the sheet metal part and partly pushed this through the central bore 58 of the die, with the central bore 58 also being able to made so that it diverges slightly downwardly, so that the piercing slug can be disposed of through this central longitudinal bore by gravity, optionally with pneumatic assistance.

After the cutting out of the piercing slug the rounded outer wall 64 at the free end of the rivet section 16 has also pressed the wall of the conical recess of the sheet metal part 50 away from the central longitudinal axis 11, i.e. brought the wall into a somewhat steeper position, and has dilated the hole 76, which has arisen by the cutting out of the piercing slug 74, to such an extent that the free end of the rivet section 16 can now be pushed through the hole 76 so that the inner curved wall 26 of the free end of the rivet section can enter into contact with the ring-like recess 66. In this way, with a further downwardly directed movement of the fastener element as a result of the pressure in the arrow direction 70, the tubular rivet section 16 is beaded over in accordance with FIG. 7 to form a rivet bead 78. Through this beading over process the sheet metal part 50 is so deformed in the region of the previous conical recess that it is clamped in form-fitted manner between the ring-like contact surface 12 and the beaded over rivet section. At the same time the noses 30 providing security against rotation are pressed into the sheet metal part so that a security against rotation also arises. When the features providing security against rotation are formed by corresponding recesses the sheet metal material is pressed into such recesses whereby a security against rotation likewise arises.

The sheet metal part is however simultaneously partly pressed into the recesses 42 which have arisen by the formation of the lugs 40 so that a security against rotation also arises in this region. Should the head part 14 of the fastener element 10 have a polygonal or grooved or ribbed shape then a corresponding form-fitted connection between the sheet metal part and the fastener element is also produced in this region.

Figure 7:
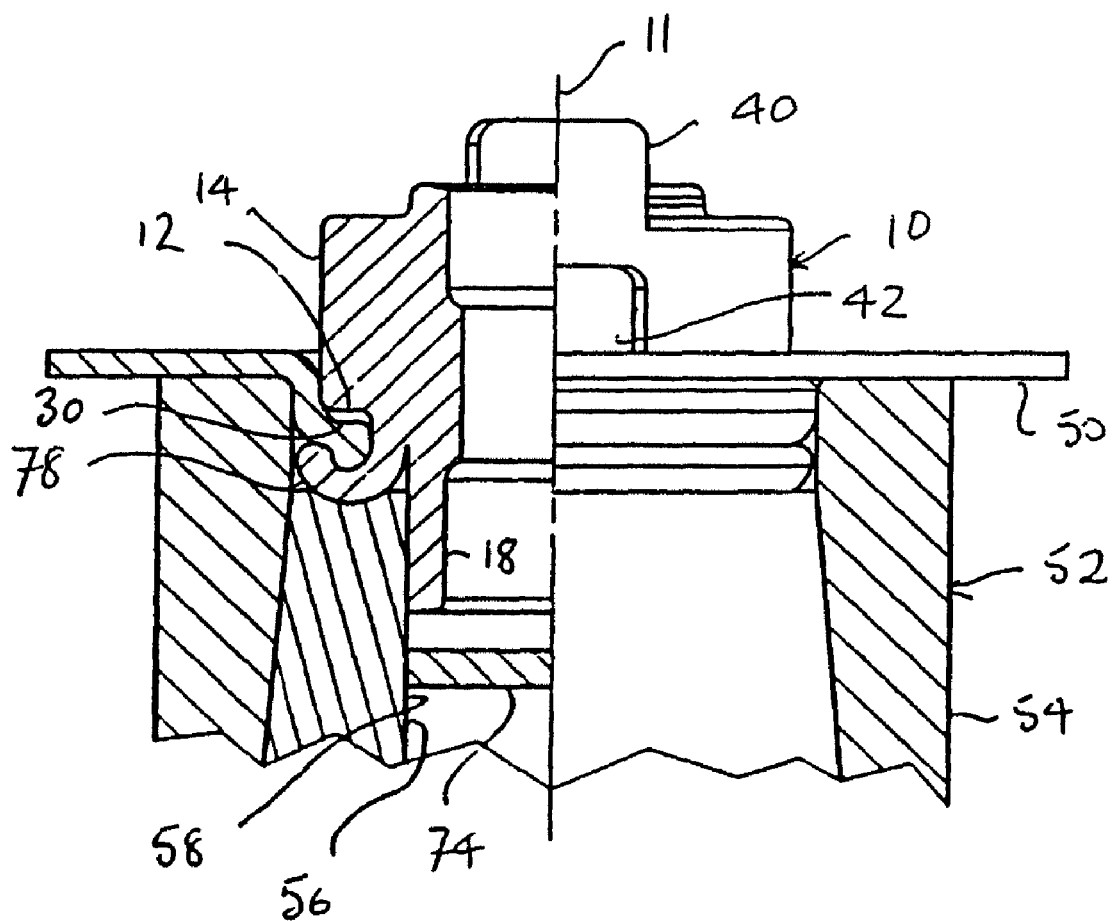
FIG. 7 shows a representation similar to FIG. 6 after completion of the attachment of the functional element of the sheet metal part.

One can see from FIG. 7 that the guide section 18 extends ever deeper into 10 the central bore 58 of the inner die part 56 during the attachment of the fastener element 10 whereby a secure guidance of the fastener element is achieved. The finished component assembly consisting of a fastener element 10 and 15 a sheet metal part 50 is then shown in FIG. 8 after removal from the attachment 2, i.e. from the press or from the robot or from attachment tools which are conceived differently.

One can see that the guide section projects clearly beyond the beaded over 20 rivet section 16. It is in other respects also possible to dimension the arrangement such that the body part 14 is accommodated still further within the recess in the sheet metal part or indeed fully within this. In the finished state in accordance with FIG. 8 a component assembly can be provided as a whole with a protective coating and an electrical terminal device, for example a cable shoe can subsequently be attached to the upper end face of the fastener element or onto the lower end face of FIG. 8, i.e. the corresponding cutting or thread forming screw can be introduced coming from the top into the cylinder bore with simultaneous formation of the thread cylinder. The lugs 40 which are provided here, make it possible to use the element as an electrical terminal element, for example as an electrical grounding element in a vehicle body.

The fastener element 10 in accordance with the present invention has the 5 special advantage that it can also be used with sheet metal parts 50 provided with protective layers or paint layers and nevertheless produces an excellent electrical connection and indeed in the region of the pierced hole and of the noses providing security against rotation which, particularly with a sharp edged design of the noses providing security against rotation locally cut through the protective coating and ensure a metallic connection to the sheet metal part 50. Moreover the protective layer is damaged at points which lie within the form-fitted connection between the sheet metal part 50 and the fastener element so that a seal is present and corrosion is prevented. The form-fitted connection between the sheet metal part and the fastener element is so intensive that the connection represents a sealed connection which, if a particular seal is necessary, can also be assisted by the application of an adhesive to the element or to the sheet metal part. Through the recess in the sheet metal part 50 in the region of the fastener element an excellent connection to the sheet metal part is ensured so that a high resistance against pull-out forces in both directions and a high button out resistance is generated and, moreover, a high resistance against shear forces and torsion forces is present. In addition, the element can be used with alternating dynamic loadings and fatigue effects with dynamic loadings need not be feared.

The FIGS. 9 to 15 relate to a further embodiment of a fastener element 10 in accordance with the invention which is very similar to the fastener element of FIGS. 1 to 8. There are essentially only two differences which will be described somewhat later. The same reference numerals are used for the embodiment of FIGS. 9 to 15, and also for the further figures, as for the first embodiment in accordance with FIGS. 1 to 8 and it will be understood that parts or features which have the same reference numeral have the same function as in the first embodiment. Insofar the previous description also applies to the following examples, unless something to the contrary is stated.

As mentioned, in the embodiment of the fastener element of FIGS. 9 to 15, there are basically represents mainly two differences with respect to the previous embodiment in accordance with FIGS. 1 to 8. In one respect this refers to the ring-like contact surface 12 which in this example is conically arranged and forms an included cone angle of 90° at the central longitudinal axis 11 of the fastener element. The features providing security against rotation are located in this example exclusively in the region of the ring-like contact surface 12. The fastener element 10 of the embodiment of FIGS. 9 to 15 is attached in precisely the same manner to a sheet metal part as in the first embodiment except that the die button is slightly modified in order to take account of the conical contact surface. Further particulars of the advantages and designs of the fastener element with a conical sheet metal contact surface can be found in the PCT application PCT/EP02/04365 of the present applicant.

The second distinction lies in the fact that the mount 80 for receiving the electrical terminal device 104 is formed in this example by a projection 41 which projects away from the upper end face of the fastener element 10 which is remote from the rivet section 16. This projection has a central bore which lies coaxial to the central bore 38 of the hollow fastener element 10 and has a somewhat larger diameter than the bore 38. In its external outline the projection is in this example eight-sided, i.e. octagonal and serves to receive an electrical terminal device 104 which can be seen from FIGS. 15 and 16. Accordingly, the electrical terminal device is formed as a sheet metal part with a cut-out 110 in the form of a passage hole through which the screw 106 projects and has three lugs 112 which project downwardly in the illustration of FIG. 15, which respectively contact one of the side surfaces of the projection, which is of octagonal shape in its external outline. The lugs 112, as well as the hole 110 and any other features of shape of the sheet metal part 104, such as for example external outline, are produced by a punching process, with the lugs 112 being formed from material which is exposed at three sides from the regions 114 by the punching process and bent downwardly. In this example, in accordance with FIGS. 15 and 16, the electrical terminal device 104 is provided as a terminal clamp of a housing 116 of an electrical unit of any desired form of construction. The electrical terminal device 104 could, however, just as well be provided with a cable connection region to which one or more cables is or are secured by crimped connection. For example the region 118 could serve for this purpose.

Figure 8:
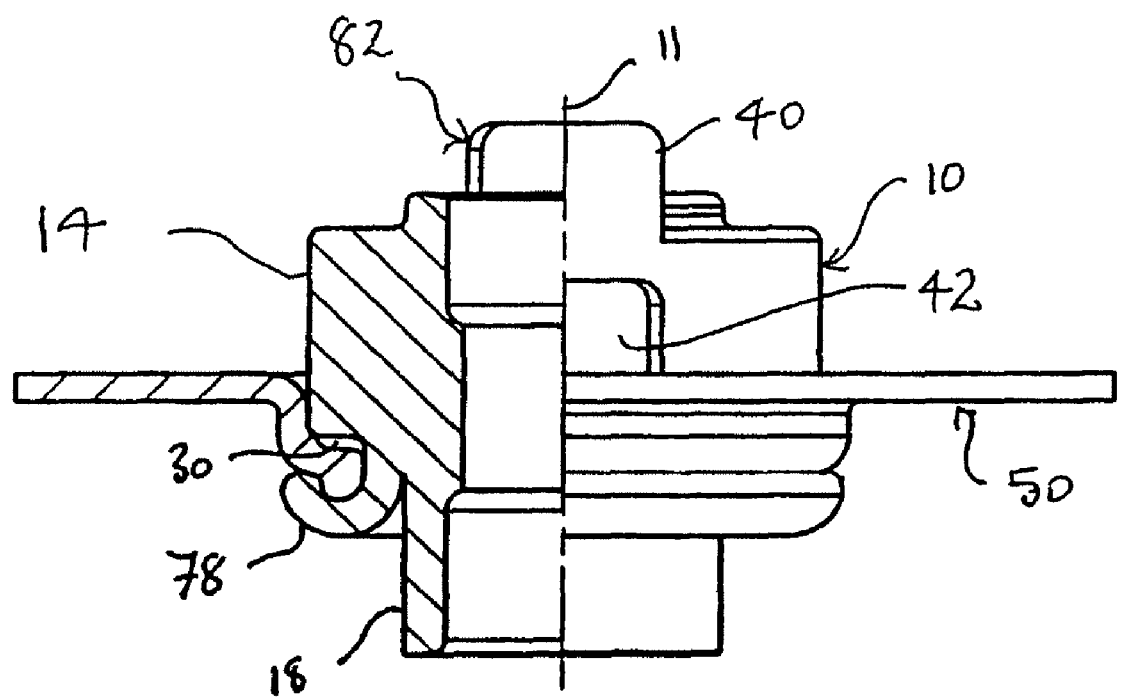
FIG. 8 shows a component assembly of FIG. 7 after the removal from the tool for the manufacture of the component assembly.
Figure 15:
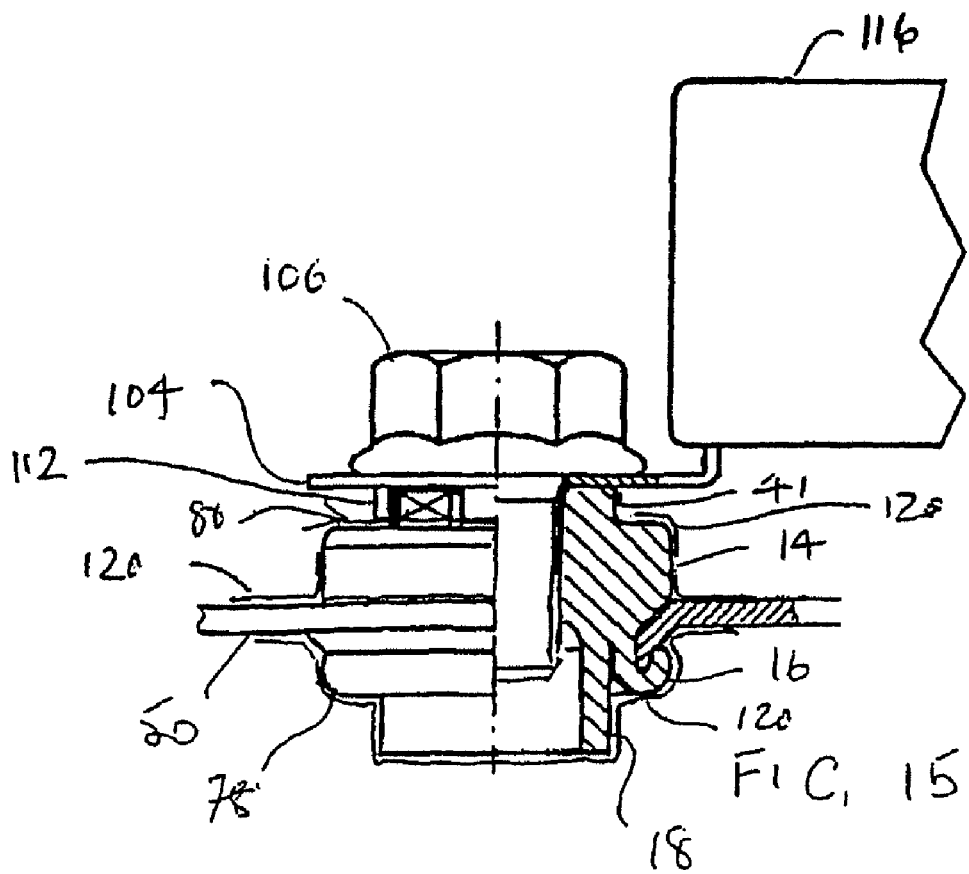
FIG. 15 shows the component assembly of FIG. 14 with an electrical terminal device which is secured via a screw to the fastener element.

The exposed surfaces of the component assembly consisting of the sheet metal part 50, the fastener element 10 of FIG. 15 including the outer sides and the upper end face of the projection 41 are, as also in other examples of the component assembly, coated with a protected coating 120 (only indicated at certain positions and not shown in FIG. 8). Nevertheless a high quality electrical connection is present between the electrical terminal device 104 and the sheet metal part 50 and indeed this connection passes from the electrical terminal device via the head of the screw 106, the shaft part of the screw 106 and the thread formed or cut into the fastener element by this screw and further via the fastener element itself and the features providing security against rotation and the pierced surfaces into the sheet metal part 50. The protective coating at the surface of the projection 41 thus does not prevent a high quality electrical connection being achieved.

Figure 17:
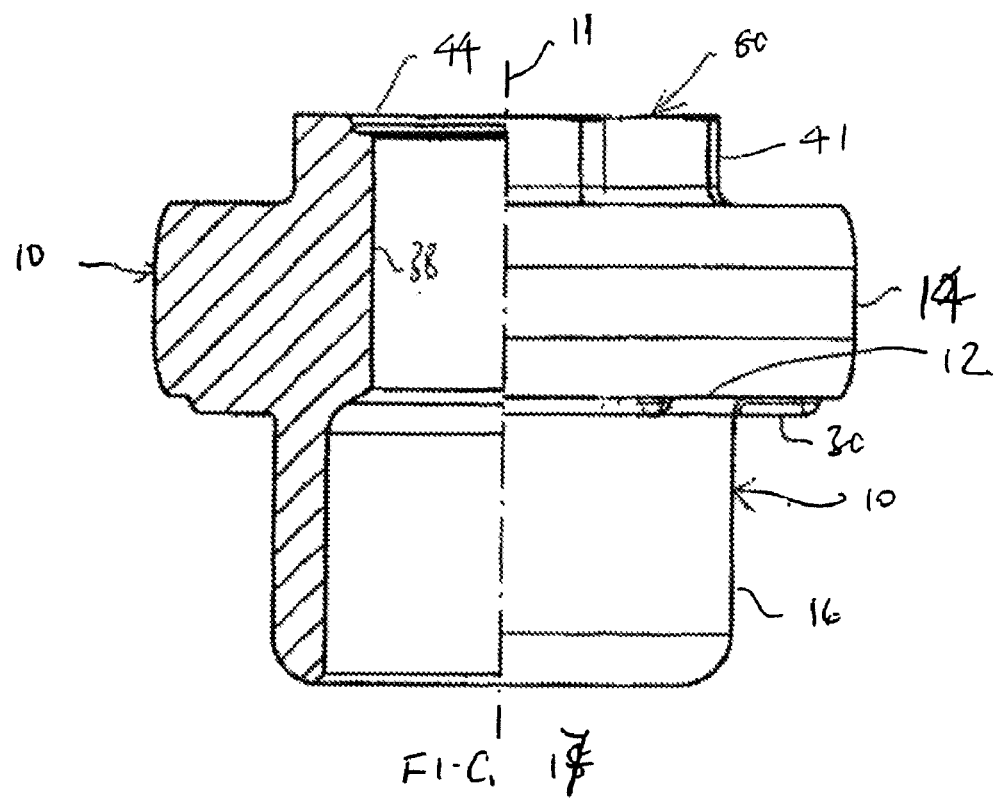
FIG. 17 shows a representation of a further embodiment of a fastener element in accordance with the invention partly in side view and partly in a longitudinally sectioned view.
Figure 18:
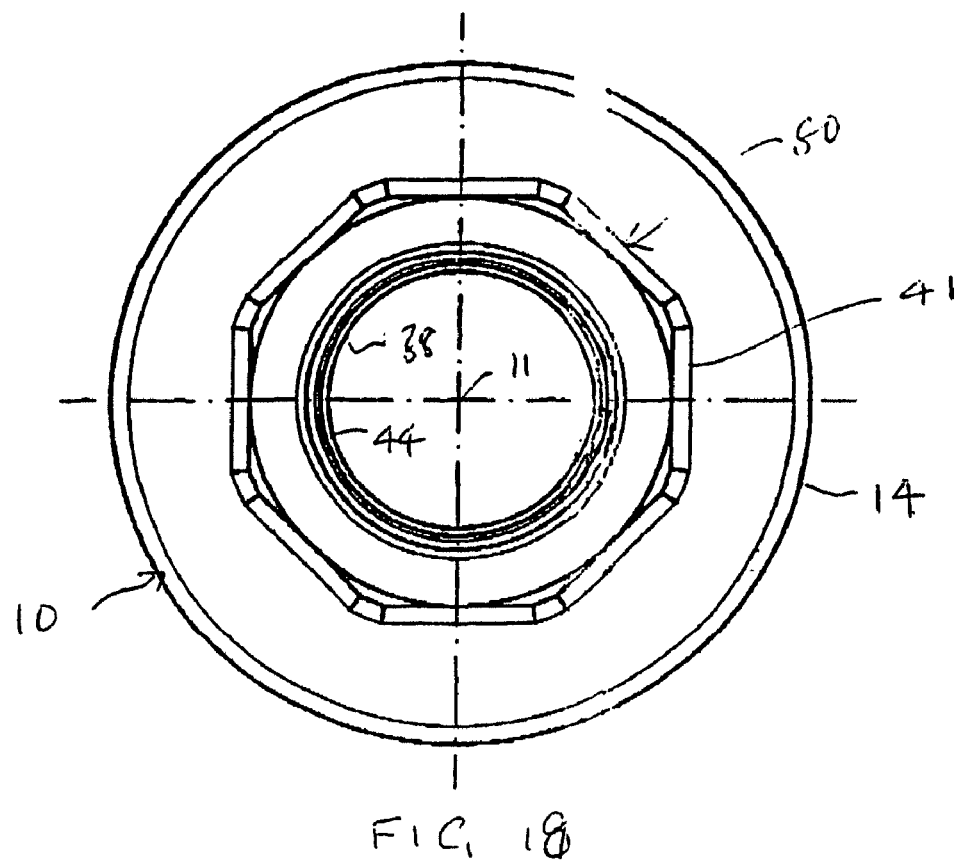
FIG. 18 shows a plan view on the top side of the fastener element of FIG. 17
Figure 19:
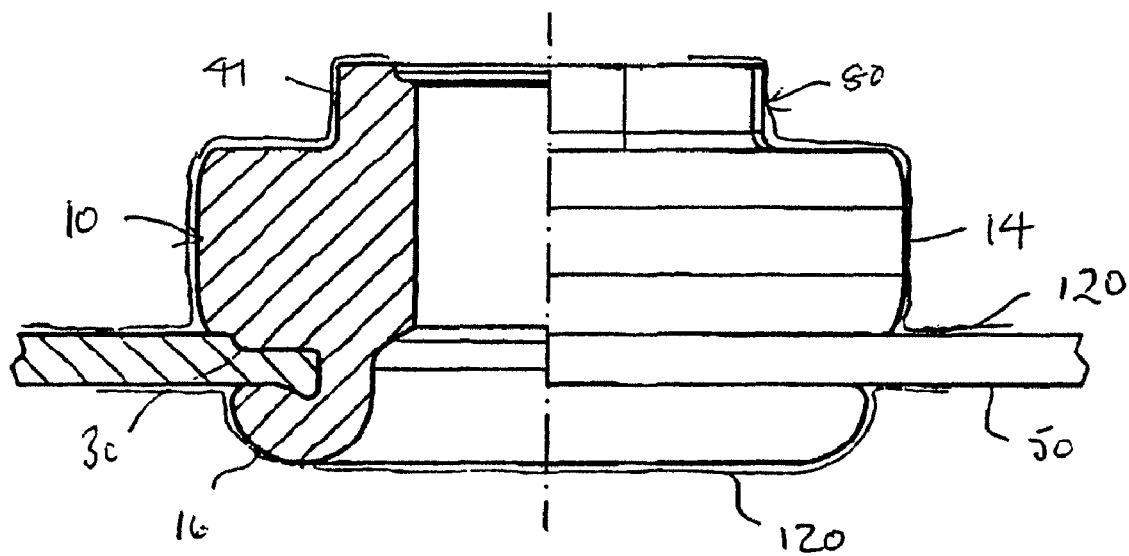
FIG. 19 shows the fastener element of FIGS. 17 and 18 after attachment to a sheet metal part.

Finally, reference is made to the further embodiment of the invention in accordance with FIGS. 17 to 19. Here also, as explained above, the same reference numerals are used for the same parts.

The fastener element 10 of FIGS. 17 to 19 is formed in accordance with the European Patent EP 0 539 793 except that here the rivet section 16 is formed as a piercing and riveting section in accordance with the description of DE 3446978 C or DE 3447006 C.

Amount 80 for an electrical terminal device is present at the free end face of the fastener element 10 of FIGS. 17 to 19, i.e. at the end face which is remote from the piercing and riveting section 16 and is formed in accordance with the mount 80 of the embodiment of FIGS. 9 to 15. It thus has a projection 41 which is octagonal in its external outline. Naturally the fastener element 10 in this example could also be provided with two lugs corresponding to the lugs 40 of the embodiment of FIGS. 1 to 8.

The present invention is not restricted to the fastener elements which are 20 shown in the Figures but rather any hollow fastener element which can be attached to a sheet metal part with an adequately high security against rotation and security against button out can be used in accordance with the invention by the provision of a corresponding mount for an electrical terminal device.

The fastener elements described here can for example be manufactured in all materials which achieve the strength class 5.6 or higher. Such metallic materials are normally carbon-steel with 0.15 to 0.55% carbon content.

In all embodiments all materials can be named as an example for the material of the fastener elements which achieve the strength values of class 8 in accordance with the ISO standard in the context of cold deformation, for example a 35B2 alloy in accordance with DIN 1654. The so formed fastener elements are suitable amongst other things for all commercially available steel materials for sheet metal parts of drawing quality as also for aluminium or its alloys. Also aluminium alloys, in particular those of higher strength, can be used for the fastener elements for example AlMg5. Also fastener elements of higher strength magnesium alloys such as for example AM5O can also be considered.

The invention claimed is:

1. A hollow fastener element for an electrically conductive attachment of an electrical terminal to a sheet metal part, wherein the hollow fastener element has a head part, a tubular rivet section projecting from said head part and merging via a conical contact surface for the sheet metal part into the head part, a tubular guide section is arranged concentric to the tubular rivet section and radially inside the latter, with a ring gap being provided between the tubular guide section and the tubular rivet section and with the tubular guide section projecting beyond a free end of the tubular rivet section, wherein on attachment of the fastener element to the sheet metal part the tubular rivet section is bent outwardly when the free end of the tubular rivet section is pressed on by a die button, wherein features providing security against rotation are provided at the conical contact surface, wherein the hollow fastener element has a bore having a first portion with a first diameter within said head part and a second portion having a second diameter within said tubular guide part, with said second diameter being larger than said first diameter, said first portion being sized for the formation of a thread by one of a thread cutting screw and a thread forming screw and wherein a mount for the rotationally secure attachment of the electrical connection device to the fastener element is provided at the end face of head part remote from the rivet section.

2. The fastener element in accordance with claim 1, wherein the mount is formed by at least one projection projecting beyond the end face of the fastener element.

3. The fastener element in accordance with claim 2, wherein the projection is arranged around the bore of the hollow fastener element and is made polygonal in its external outline.

4. The fastener element in accordance with claim 3, wherein the projection is made triangular, square, hexagonal or octagonal in its external outline.

5. The fastener element in accordance with claim 1, wherein the tubular rivet section has a wall with a free end, said free end being rounded when viewed in an axial section plane both at a radially outer side and also at a radially inner side.

6. The fastener element in accordance with claim 5, wherein the free end of the tubular rivet section has one of a semi-circular shape and a shape resembling an arrow-tip.

7. The fastener element in accordance with claim 1, wherein the ring gap has a radial dimension in a range between 0 mm and approximately 3 mm.

8. The fastener element in accordance with claim 1, wherein the ring gap finishes at an axial distance before the conical contact surface at a side of the conical contact surface adjacent the tubular rivet section.

9. The fastener element in accordance with claim 1, wherein the tubular guide section is formed as a piercing section and has a conical cutting edge at its end remote from the conical contact surface.

10. The fastener element in accordance with claim 1, wherein features providing security against rotation are formed by at least one of noses and grooves.

11. The fastener element in accordance with claim 10, in which noses providing security against rotation are provided and are present in raised form at the conical contact surface and at the tubular rivet section in the region of the transition from the conical contact surface to the tubular rivet section.

12. The fastener element in accordance with claim 11, wherein the noses providing security against rotation extend in the radial direction at the conical contact surface and in the axial direction at the tubular rivet section.

13. The fastener element in accordance with claim 1, wherein the features providing security against rotation are noses which are one of noses having a generally rounded shape and noses having side flanks which lie in planes extending in a longitudinal direction of the element.

14. A component assembly comprising of a sheet metal part and a hollow fastener element attached to it via a rivet connection, the hollow fastener element being for the electrically conductive attachment of an electrical terminal to the sheet metal part, wherein the hollow fastener element has a head part, a tubular rivet section projecting from said head part and merging via a conical contact surface for the sheet metal part into the head part, there being a tubular guide section arranged concentric to the tubular rivet section and radially inside the latter, with a ring gap being provided between the tubular guide section and the tubular rivet section and with the guide section projecting beyond the free end of the rivet section, wherein features providing security against rotation are provided at the conical contact surface, wherein a bore is provided in said fastener element, said bore having a first portion with a first diameter within said head part and a second having a second diameter within said tubular guide part, with said second diameter being larger than said first diameter, said first portion being sized for the formation of a thread by one of a thread cutting screw and a thread forming screw and wherein a mount for the rotationally secure attachment of the electrical connection device to the fastener element is provided at the end face of head part remote from the rivet section and wherein the hollow fastener element has an electrically conductive rivet connection to the sheet metal part and is rotationally fixedly secured to the sheet metal part by means of features providing security against rotation provided at said conical contact surface and engaging into the sheet metal part, with the fastener element and the sheet metal part being jointly coated with one of an electrically non-conductive coating and a poorly conductive protective coating and an electrically conductive path being provided between the fastener element and the sheet metal part in at least one of the region of the rivet connection and the features providing security against rotation and wherein the tubular rivet section is deformed to a rivet bead which traps a rim of a hole the sheet metal part between itself and the conical contact surface.

15. The component assembly in accordance with claim 14, wherein a thread cutting or forming screw is screwed into the hollow fastener element and holds the electrical connection device at the hollow fastener element in the manner secure against rotation.

16. The component assembly in accordance with claim 14, wherein the mount s formed by at least one projection projecting beyond the end face of the fastener element.

17. The component assembly in accordance with claim 16, wherein the projection is arranged around the bore of the hollow fastener element and is made polygonal in its external outline.

18. The component assembly in accordance with claim 17, wherein the projection is made triangular, square, hexagonal or octagonal in cross-section.

* * * * *